March 9, 1926. Re. 16,285
R. M. BROWN
LOCOMOTIVE
Original Filed July 11, 1923 5 Sheets-Sheet 1
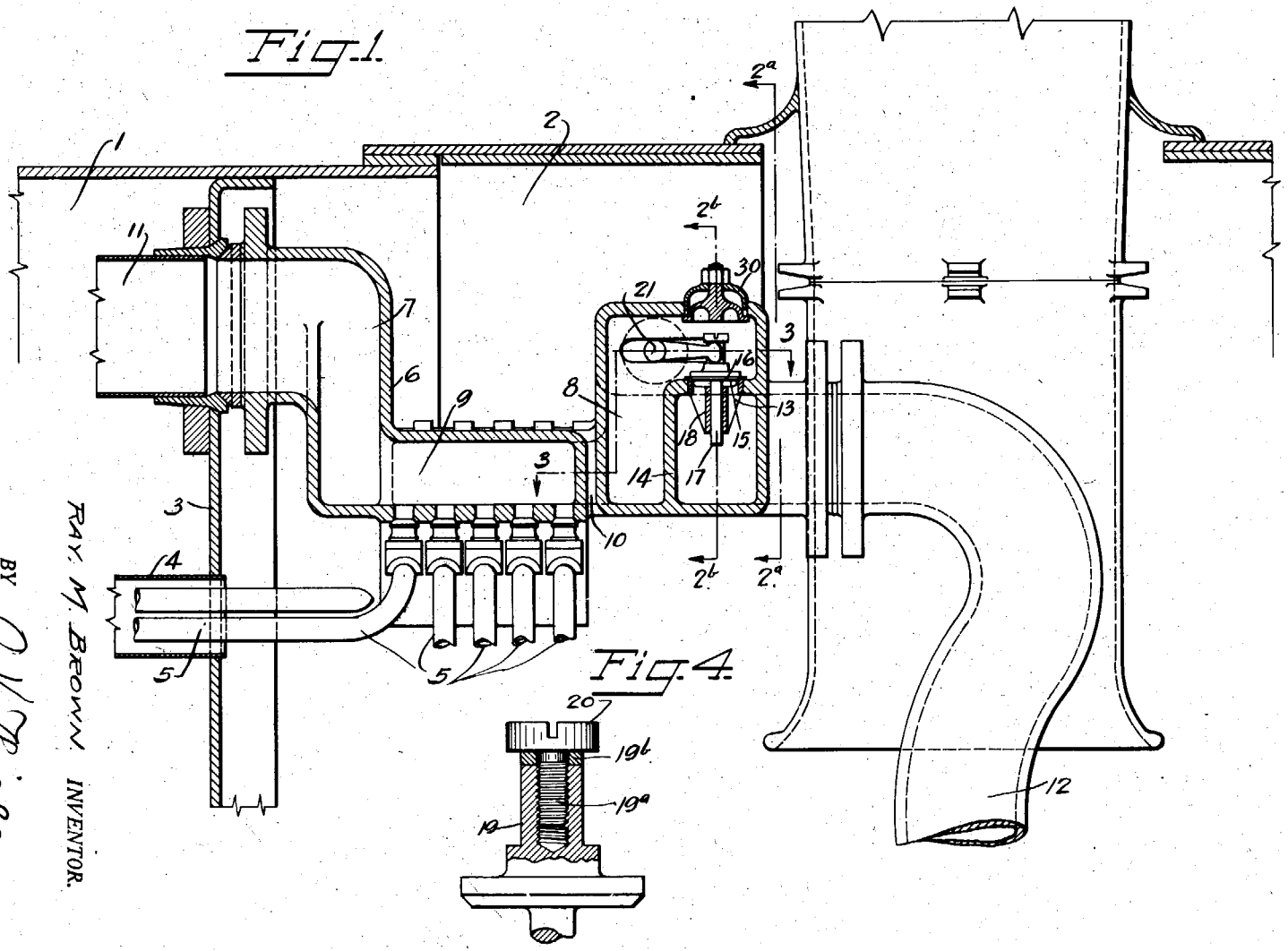
RAY. M. BROWN. INVENTOR.
BY O. V. Thiele
ATTORNEY.

March 9, 1926. Re. 16,285
R. M. BROWN
LOCOMOTIVE
Original Filed July 11. 1923 5 Sheets-Sheet 2
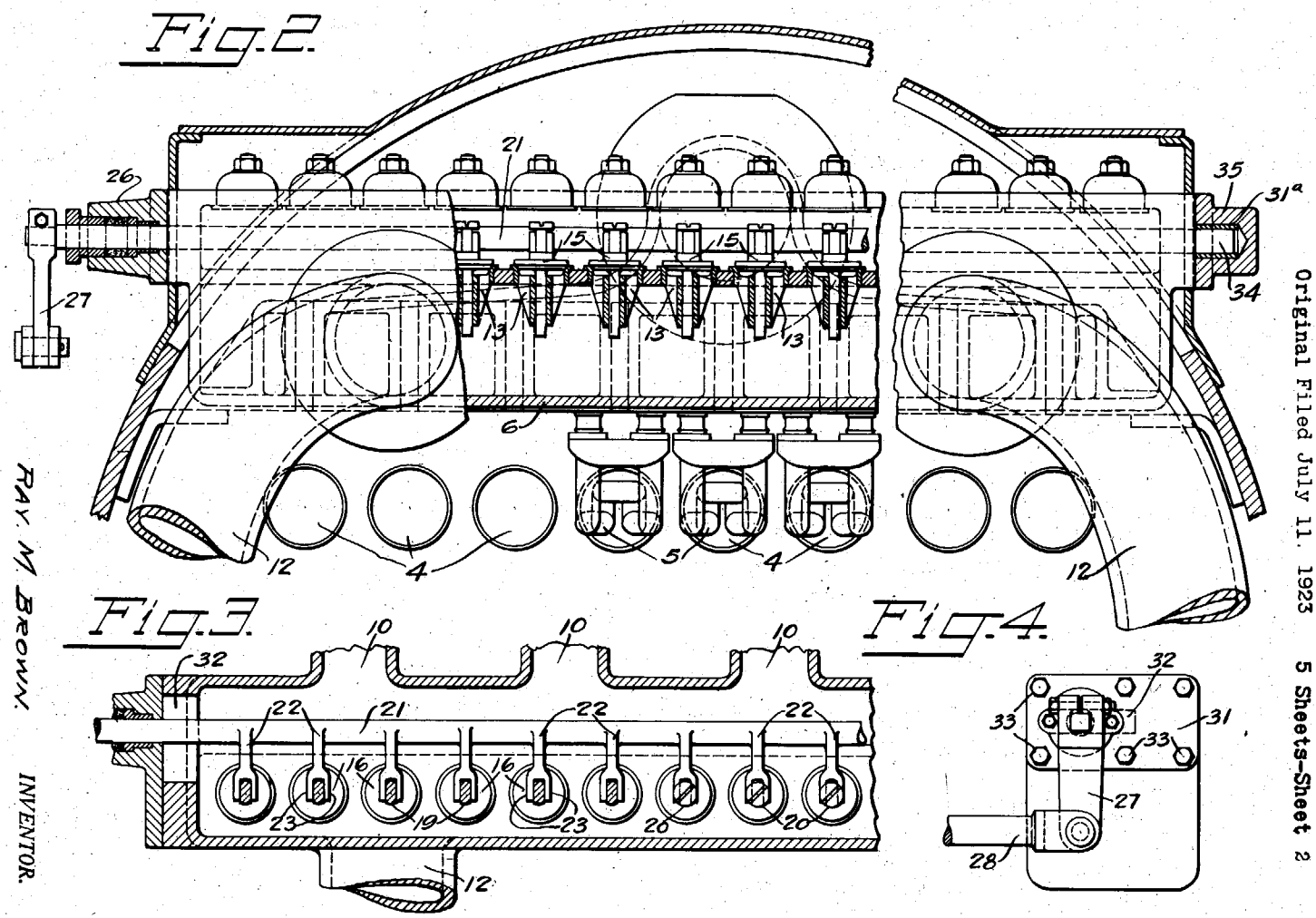
RAY. M. BROWN. INVENTOR.
BY O. V. Thiele
ATTORNEY.

March 9, 1926. Re. 16,285

R. M. BROWN

LOCOMOTIVE

Original Filed July 11, 1923 5 Sheets-Sheet 3

RAY. M. BROWN INVENTOR.

BY C. V. Thiele

ATTORNEY.

March 9, 1926. Re. 16,285

R. M. BROWN

LOCOMOTIVE

Original Filed July 11, 1923 5 Sheets-Sheet 4

RAY. M. BROWN. INVENTOR.

BY

O. V. Thiele

ATTORNEY.

March 9, 1926. Re. 16,285

R. M. BROWN

LOCOMOTIVE

Original Filed July 11, 1923 5 Sheets-Sheet 5

RAY. M. BROWN. INVENTOR.

BY O. V. Thiele

Reissued Mar. 9, 1926.

Re. 16,285

UNITED STATES PATENT OFFICE.

RAY M. BROWN, OF YONKERS, NEW YORK.

LOCOMOTIVE.

Original No. 1,570,228, dated January 19, 1926, Serial No. 650,850, filed July 11, 1923. Application for reissue filed February 2, 1926. Serial No. 85,604.

*To all whom it may concern:*

Be it known that I, RAY M. BROWN, 165 Bruce Avenue, a citizen of the United States, and resident of Yonkers, New York, have invented certain new and useful Improvements in Locomotives, of which the following is a description.

My invention relates to locomotives, particularly those equipped with superheaters. It has for its purpose the provision of steam throttling means with a number of improved features which will appear clearly from the description given below, and among which may be mentioned, the following:—

My device makes it possible to distribute the steam accurately through the superheater so that each portion of the superheater does its proper portion of the work.

A ready means is provided by my device to pass an initial small amount of steam which will balance the main throttling means so they will open easily.

My device provides a ready means for supplying the proper amount of "drifting steam."

The improved throttling means I provide is easy to make steam-tight and easy to keep steam-tight, as all large throttle bodies in which warping and distortion are bound to occur are eliminated.

The invention is illustrated in the drawings which accompany this description. In these drawings, Fig. 1 shows a vertical longitudinal section of the upper part of a locomotive equipped with my improved throttling means;

Fig. 2 is a sectional view on line $2^a$—$2^a$ of Fig. 1 looking in the direction of the arrows, a portion of this view being a section on line $2^b$—$2^b$ of Fig. 1;

Fig. 3 is a fragmentary sectional view on line 3—3 of Fig. 1 looking in the direction indicated by the arrows;

Fig. 4 is a view of a portion of the device viewed from the left end of Fig. 2;

Figure 5:
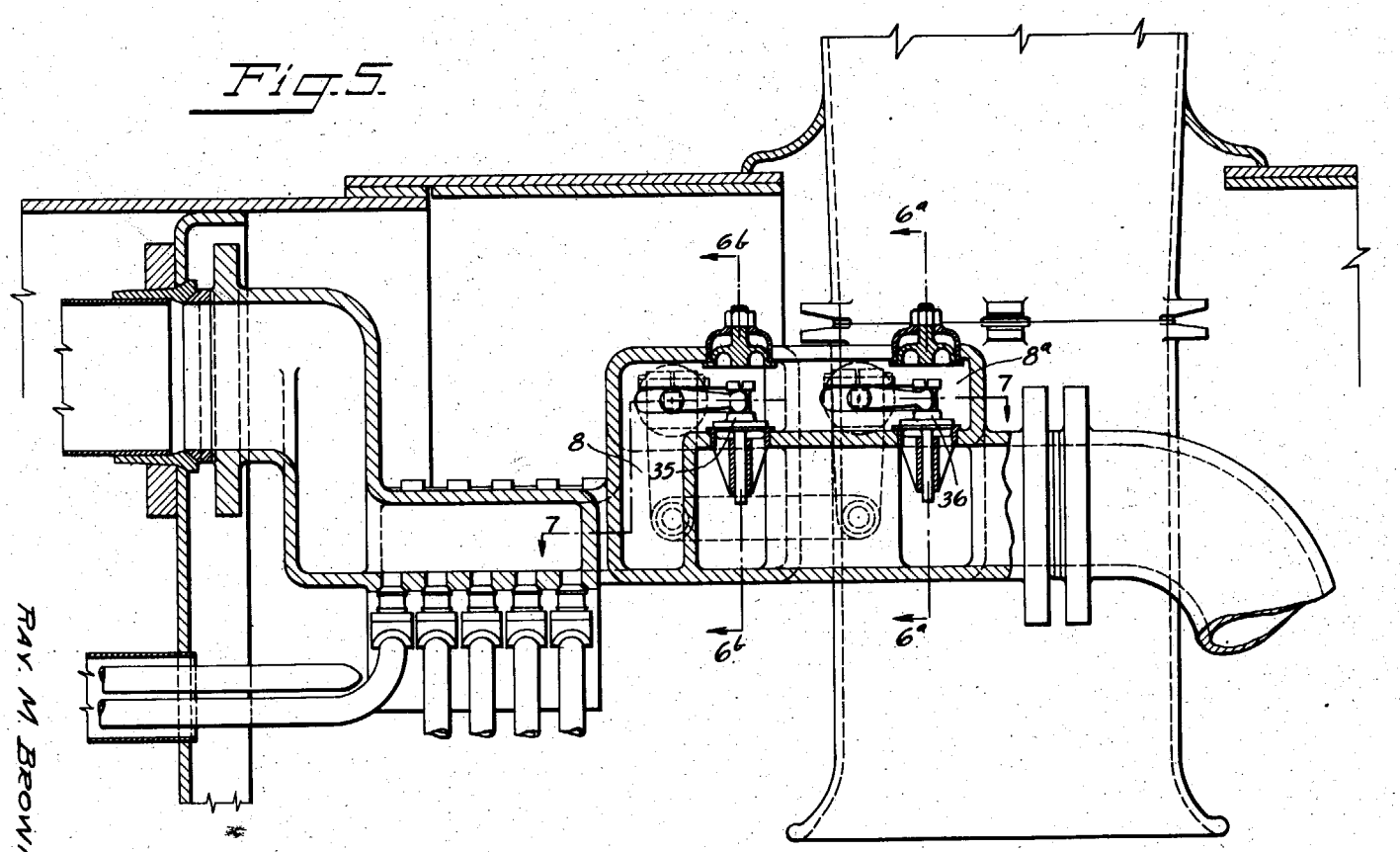
Figures 5, 7, 8:
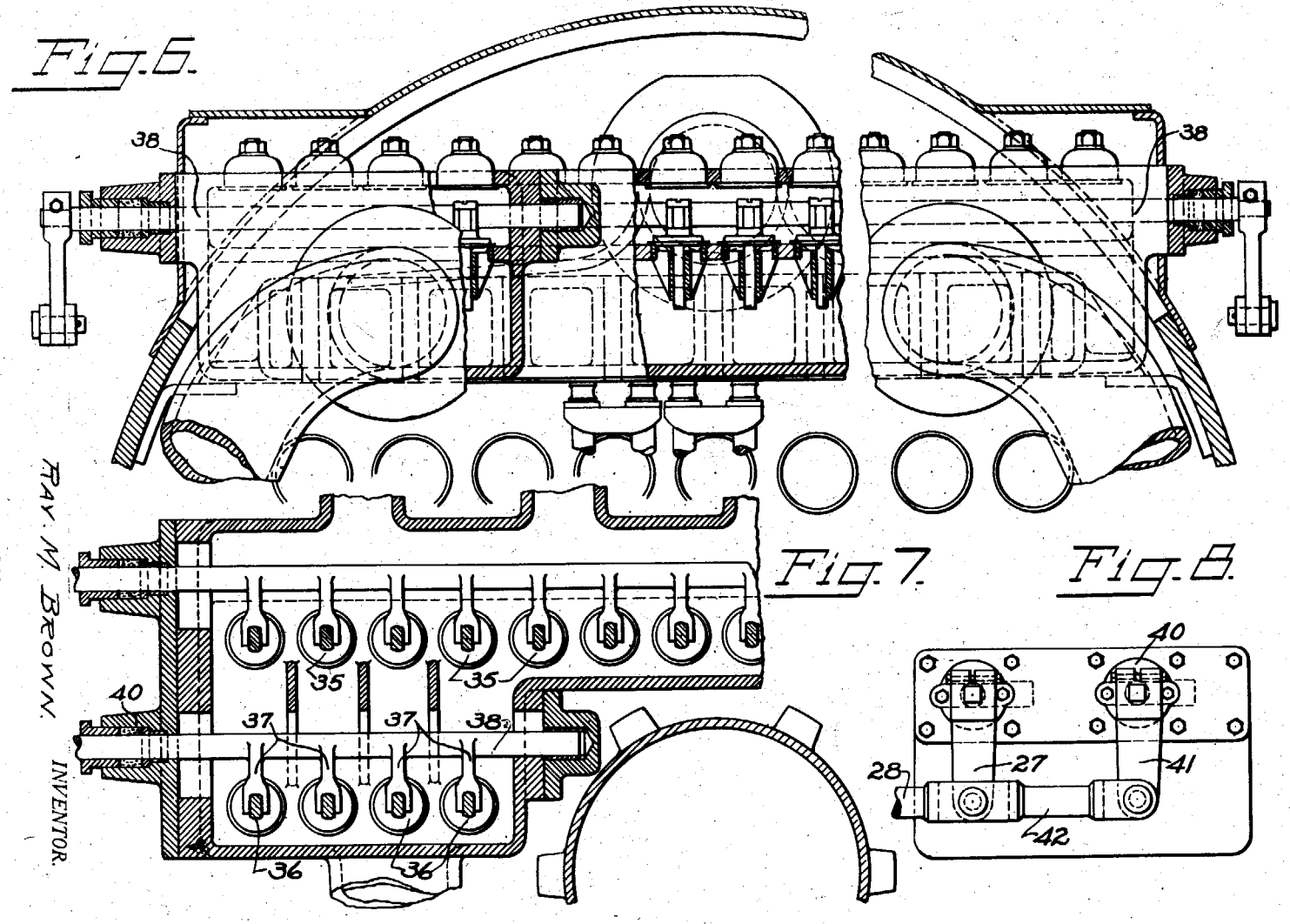
Figure 9:
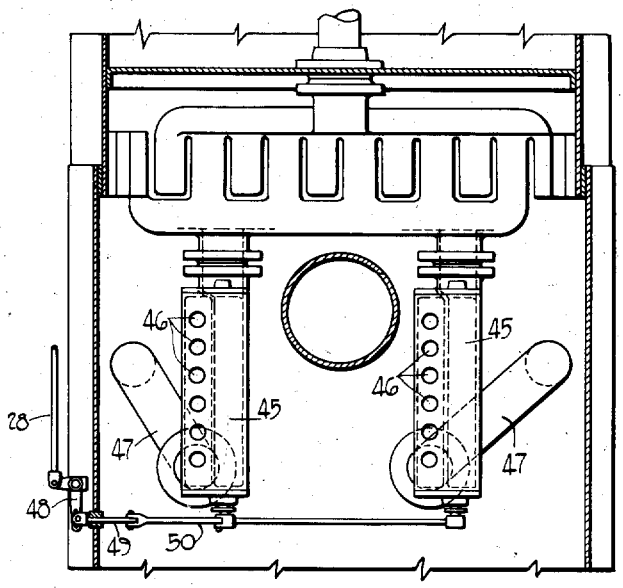
Figure 10:
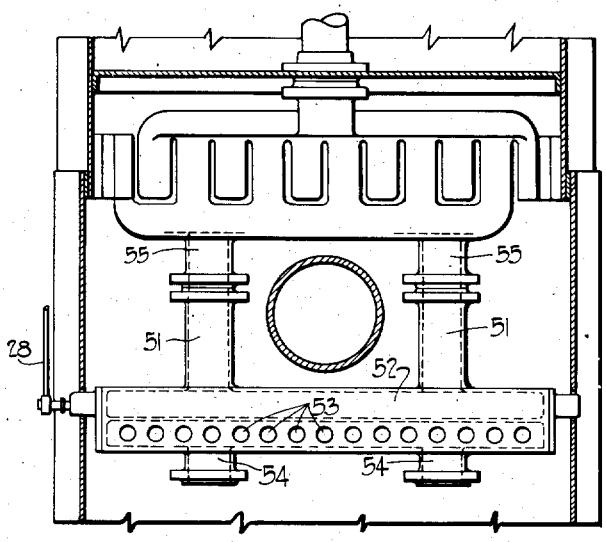

Fig. $4^a$ shows a detail on an enlarged scale;

Fig. 5 is a view similar to Fig. 1 showing a modified form of my invention;

Fig. 6 is a front view of Fig. 5, with portions in section on line $6^a$—$6^a$ and others in section on line $6^b$—$6^b$;

Fig. 7 is a sectional view on line 7—7 of Fig. 5 looking in the direction indicated by the arows;

Fig. 8 is a view of the modification shown in Fig. 5, this view corresponding to Fig. 4 of the first form;

Fig. 9 is a sectional top view of the front end of a locomotive illustrating a modified form of my invention;

Fig. 10 is a view similar to Fig. 9 showing a further modification.

Fig. $4^a$ is on a somewhat enlarged scale, while Figs. 9 and 10 are on a somewhat smaller scale than Figs. 1 to 8.

Throughout the views, portions have been broken away and omitted when this seemed advisable in the interest of clearness.

Reference will first be made to the form of my invention illustrated in Figs. 1 to 4.

The steam and water space 1 of the locomotive to which I here show invention applied, is separated from the smoke box 2 by the tube sheet 3.

A series of flues 4 extends back from this flue sheet to the back flue sheet (not shown) in the usual manner. Only one row of these flues appears in the drawing; but it will be understood that there are other rows below this top row.

Within these flues 4 there are located the usual superheater elements or units 5, whose ends are connected to the superheater header 6. This superheater header has two chambers 7 and 8, from which the intermeshing fingers 9 and 10 extend in the usual way. It is to these intermeshing fingers that the ends of the superheater elements 5 are connected. Steam is supplied to the chamber 7 by the dry pipe 11.

As far as described the arrangement is of a usual form. To control the flow of steam through the dry pipe 11 and the superheater, some controlling throttle is required. The almost universal practice formerly was to locate this throttle at the inlet end of the dry pipe 11. It is however, no longer unusual to place the throttle at some point between the superheater header and the steam chest and this arrangement has certain advantages. It has been proposed in the past to use either a single throttle or a pair of throttles in the latter location. In case two throttles were employed, one of them controlled the flow through one of the steam pipes leading the steam to one side of the locomotive the other throttle controlling a steam pipe on the other side.

My invention contemplates putting the controlling throttle means between the superheater and the steam chests. Instead however, of using a single large throttle or two throttles (one for each steam pipe) I use a series of small poppet valves. These poppet valves are preferably located directly in the second chamber of the superheater header, i. e., the chamber which receives the superheated steam from the superheater elements, this second chamber being somewhat modified for this purpose. A partition 14 separates it into two parts and the steam, instead of being allowed to flow directly from chamber 8 to the steam pipes 12, must flow through the ports 13 in this partition 14. These ports are controlled by the poppet valves 15. These poppet valves may be of any usual or preferred material or general construction; for purposes of illustration I show them as comprising a body 16 and a stem 17, the latter reciprocating in the spider 18. To actuate these valves, I provide each with an upward extension 19, which has at its upper end a head 20, this head projecting laterally beyond the extension 19. The detailed construction of the upper end of the extension 19 is shown in Fig. 4[a]. A tapped hole extends into the upper end of the extension and the screw 19[a] is screwed into this hole, the distance to which it is screwed in being determined by the thickness of the distance piece 19[b]. By selecting a distance piece of proper thickness the distance of head 20 from the valve body can be varied as desired.

A rocker shaft 21 extends through the chamber 8, parallel and adjacent to the series of poppet valves. From this shaft 21 there extends a series of arms 22, one for each valve. Each arm 22 is forked, the two branches 23—23 embracing the valve extension 19. The two branches 23—23 will engage the under surface of the heads 20 if the shaft 21 is slightly rotated in one direction, and will engage the upper surfaces of the valve bodies 16 if the shaft is slightly rotated in the opposite direction.

To rotate or rock the shaft 21 through the required angle, it is extended outward from the space 8 through a stuffing box 26 and has secured to its outer end the arm 27. From the end of this arm 27 there extends back to the cab the rod 28, the farther end of this rod 28 being connected by suitable mechanism to the engineer's throttle lever so it may be operated by the engineer to give the shaft 21 the proper rocking movement.

The stuffing boxes required for the shaft operating the throttling means are outside of the smoke-box, and out of contact with the direct current of superheated steam, so that packing troubles are minimized.

With the described construction and arrangement of these valves it is possible to adjust them to open them in any sequence desired and to have some of them opened farther than others during normal running of the locomotive. The preferred means of accomplishing this is to vary the spaces between the upper surface of branches 23 and the lower surface of head 20 which they engage. This variation may be made by grinding one or the other of these surfaces or preferably by adjusting the height of the head 20 above the valve in the manner above described or by some other preferred means. In Fig 2 for example, it will be noted that the branches 23—23 of the two valves near the center are in engagement with the heads 20 while the remaining ones are still some distance from their heads 20. The moment the rotation or rocking of the shaft 21 starts, these two central valves will open. After they have been opened, the branches 23—23 of the other valves will come into engagement with their heads 20 and these valves will then be raised from their seats.

One purpose of this is that one or two of the valves can be opened to begin with so as to admit some steam to the under side of all the valves so that they become balanced and are easily opened.

It will be evident that by suitably adjusting the heads 20 some of the valves will be open farther than others when the engineer has moved the lever all the way. It has been found that the steam flow through the various parts of the superheater is not always uniform. The reason for this probably is that in the arrangement now commonly used the steam is admitted at a single point to one chamber of the header and is taken off at only two points from the opposite chamber and that there will be certain paths including the superheater elements nearest the inlet and outlet which offer less resistance than certain other paths and which therefore receive more than their proportion of the steam flow. By my arrangement it is possible to decrease the resistance to the steam flow over any area desired or to increase it over others. By setting those poppet valves which lie opposite the areas of higher resistance so they will be opened wider than the others, more steam will be directed to such areas. The entire number of superheater units can thus be made to bear equal portions of the load. This is illustrated in Fig. 2, where the branches 23 actuating the two central valves are in engagement with their heads 20, ready to raise them at the first part of the motion of shaft 21, while for those away from the center the branches 23 are successively farther and farther from their heads 20, and will engage them successively as the shaft 21 rotates. When the last valves are finally opened, those at the center are evidently open a greater distance than those whose opening occurred last. The order in time and amount of opening will in practice vary with circumstances.

It is common practice for locomotive engineers to "crack the throttle" while "drifting". This means that instead of shutting off the steam supply entirely when the locomotive requires no motive power, as on down grades or when approaching a stop, the engineer leaves the throttle slightly open. The purpose of thus supplying a small amount of drifting steam is to prevent air and cinders from being drawn into the steam chest and cylinders from the smokebox. This "cracking the throttle" requires considerable skill with throttles of the usual size. If the throttle is opened too wide the steam supply will drive the engine and an uncalled for amount of braking will have to be done; while, if it is not opened wide enough the purpose is not accomplished. With my arrangement it is easy to supply the right amount of drifting steam as the first movement of the throttle lever opens only one or two small valves and a considerable variation of the throttle lever from the proper drifting position may occur without detriment.

Provision must be made for inserting and removing the valves, as well as for periodically grinding them in. Access to the valves for this purpose is gained through openings in the header wall directly over the valves, which openings are normally closed by the covers 30. As illustrated, the extensions 19 are flat, and the valves cannot be ground without disengaging them from the branches 23 of arms 22. This disengagement, as well as shifting the arms out of the way entirely for insertion or removal of the valves is made possible by the following provision. The stuffing box 26 as well as the bearing 35 for the opposite end 34 of shaft 21 are formed in separate plates 31, and 31[a], which are secured to the header by cap screws 33 (see Fig. 4). The opening in the header wall proper in each case is in the form of a slot, 32 (see Figs. 3 and 4); so that, after screws 33 are removed, the shaft 21 can be slid back out of the way.

The valves need not all be arranged in a single row as so far described.

In the modification illustrated in Figs. 5, 6, 7 and 8 there is one series of valves 35—35 lying in a single row across the header and corresponding to the single row in the principal form first described. In addition to this there is a shorter series of valves 36—36 at each side of the stack and located in an extension 8[a] of the space 8. These valves are in every respect similar to those above described, the arms 37 operating them being in each case secured to a short countershaft 38. This countershaft 38 extends out through a stuffing box 40 and has secured to it the arm 41. To the lower end of this arm 41 there is pivotally connected the forward end of the short extension 42 of rod 28.

The operation of these additional valves 36 will at once be clear. They too have the adjustable features described above, which features permits the balance of the valves and the proper distribution of the steam flow. The provision for insertion, removal, and grinding of the additional valves is strictly similar to that for the first series and will be clear from the drawing.

Instead of being located in a row across the smoke box, the valves may also be placed as illustrated in Fig. 9 in rows extending lengthwise. In this figure two such rows are shown, one on each side of the stack. Steam from the superheater header flows to chambers 45—45, thence through the valves 46—46 to the steam pipes 47—47. The valves 46—46 are operated by shafts, just as those described above. These shafts are actuated by rod 28 through the bell crank 48 and the links 49 and 50.

In the modification shown in Fig. 10 I illustrate a form in which the valves are placed forward of the stack. The two connections 55—55 instead of delivering steam directly to the steam pipes as in the present standard practice deliver it to the connections 51—51 which carry it to the throttle casing 52. In this throttle casing are located the valves 53—53, which are constructed and operated as those above described, the rod 28 actuating the shaft extending transversely through the chamber 52. The steam passed by the poppet valves 53 passes to the steam chest by means of the connections 54—54.

The forms shown in Figs. 9 and 10 illustrate that my invention can be applied to locomotives equipped with existing styles of superheater headers.

It will be obvious that in practicing my invention, many variations are possible without departing from the spirit of the subjoined claims. For example it is obviously not required that the valves be of the precise form of those that I show or that they be in the precise location shown or that the mechanism actuating them be just like that shown and described

What I claim is:—

1. In apparatus of the class described, the combination of a superheater comprising an elongated chamber having a series of ports along its length through which superheated steam is delivered to the chamber, and having an outlet through which the steam is conveyed to the point of use; partitioning means separating the inlet ports from the outlet and provided with a series of relatively small openings distributed opposite said steam delivery ports; and a corresponding series of valves each controlling one of said openings.

2. In apparatus of the class described, the combination of a superheater comprising a chamber having a series of ports through which superheated steam is delivered to the chamber and having an outlet through which it is delivered to the point of use; partitioning means separating the inlet ports from the outlet and provided with a series of relatively small openings distributed opposite said inlet ports and a corresponding series of valves each controlling one of said openings.

3. In apparatus of the class described, the combination of a superheater comprising an elongated chamber having a series of ports along its length through which superheated steam is delivered to the chamber, and having an outlet through which the steam is conveyed to the point of use; partitioning means separating the inlet ports from the outlet and provided with a series of relatively small openings distributed opposite said steam delivery ports; and a series of relatively small poppet valves each controlling one of said openings and opening in a direction contrary to the steam flow.

4. In apparatus of the class described, the combination of a superheater comprising an elongated chamber having a series of ports along its length through which superheated steam is delivered to the chamber, and having an outlet through which the steam is conveyed to the point of use; and valve means controlling the steam flow from said chamber and distributed along a line opposite said steam inlet ports.

5. In apparatus of the class described, the combination of a superheater comprising an elongated chamber having a series of ports along its length through which superheated steam is delivered to the chamber, and having an outlet through which the steam is conveyed to the point of use; partitioning means separating the inlet ports from the outlet and provided with a series of relatively small openings distributed opposite said steam delivery ports; a corresponding series of valves, each controlling one of said openings; means to operate said valves, and adjusting means associated with the valves whereby the valves may be caused to open in any desired order.

6. In apparatus of the class described, the combination of a superheater comprising an elongated chamber having a series of ports along its length through which superheated steam is delivered to the chamber, and having an outlet through which the steam is conveyed to the point of use; partitioning means separating the inlet ports from the outlet and provided with a series of relatively small openings distributed opposite said steam delivery ports; a corresponding series of valves, each controlling one of said openings; means to operate said valves; and adjusting means associated with some of the valves whereby they may be opened in advance of the others.

7. In apparatus of the class described, the combination of a superheater comprising an elongated chamber having a series of ports along its length through which superheated steam is delivered to the chamber, and having an outlet through which the steam is conveyed to the point of use; partitioning means separating the inlet ports from the outlet and provided with a series of relatively small openings distributed opposite said steam delivery ports; a corresponding series of valves, each controlling one of said openings; means to operate said valves, and adjusting means associated with the valves whereby during normal operation some of the valves may be caused to open farther than others.

8. In apparatus of the class described, the combination of a superheater comprising an elongated chamber having a series of ports along its length through which superheated steam is delivered to the chamber, and having an outlet through which the steam is conveyed to the point of use; partitioning means separating the inlet ports from the outlet and provided with a series of relatively small openings distributed opposite said steam delivery ports; a corresponding series of valves, each controlling one of said openings; means to operate said valves, and adjusting means associated with the valves whereby the valves may be caused to open in any desired order, and some of the valves may be caused during normal operation to open farther than others.

9. In apparatus of the class described, the combination of a boiler; a superheater comprising a bi-chambered header and tubular superheater elements the two ends of each of which are secured respectively to the two header chambers; a dry-pipe delivering steam from the boiler to one of the header chambers; a passage conveying steam away from the other of the header chambers; and a series of comparatively small valves controlling the flow of steam through said passage, said valves being distributed along the second header chamber in juxtaposition to the element ends.

10. In apparatus of the class described, the combination of a boiler; a superheater comprising a bi-chambered header and tubular superheater elements the two ends of each of which are secured respectively to the two header chambers; a dry-pipe delivering steam from the boiler to one of the header chambers; a passage conveying steam away from the other of the header chambers; a series of comparatively small poppet valves controlling the flow of steam through said passage, said valves being distributed along the second header chamber in juxtaposition to the element ends; a shaft arranged adjacent and parallel to the series of poppet valves; a series of operating elements on the shaft one for each valve and engaging it to operate it; and means to rotate the shaft whereby said valves may be opened and closed.

In witness whereof I have hereunto affixed my signature.

RAY M. BROWN.